United States Patent
Gable et al.

(10) Patent No.: US 7,016,833 B2
(45) Date of Patent: Mar. 21, 2006

(54) SPEAKER VERIFICATION SYSTEM USING ACOUSTIC DATA AND NON-ACOUSTIC DATA

(75) Inventors: Todd J. Gable, Walnut Creek, CA (US); Lawrence C. Ng, Danville, CA (US); John F. Holzrichter, Berkeley, CA (US); Greg C. Burnett, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 895 days.

(21) Appl. No.: 09/879,469

(22) Filed: Jun. 12, 2001

(65) Prior Publication Data
US 2005/0060153 A1    Mar. 17, 2005

Related U.S. Application Data

(60) Provisional application No. 60/252,305, filed on Nov. 21, 2000.

(51) Int. Cl.
*G10L 11/06* (2006.01)

(52) U.S. Cl. ...................... 704/209; 704/201
(58) Field of Classification Search ............... 704/200, 704/201, 209, 250
See application file for complete search history.

(56) References Cited

U.S. PATENT DOCUMENTS

| | | | |
|---|---|---|---|
| 4,401,855 A | 8/1983 | Broderson et al. .......... 704/219 |
| 4,862,503 A | 8/1989 | Rothenberg ................ 704/235 |
| 4,959,865 A * | 9/1990 | Stettiner et al. ............. 704/233 |
| 5,171,930 A | 12/1992 | Teaney ........................ 84/725 |
| 5,251,261 A * | 10/1993 | Meyer et al. ............... 704/211 |
| 5,326,349 A | 7/1994 | Baraff ............................ 623/9 |
| 5,454,375 A | 10/1995 | Rothenberg ................. 600/538 |
| 5,473,726 A | 12/1995 | Marshall |
| 5,522,013 A | 5/1996 | Vanska ........................ 704/255 |
| 5,528,726 A | 6/1996 | Cook ........................... 704/261 |
| 5,573,012 A | 11/1996 | McEwan ..................... 600/595 |
| 5,659,658 A | 8/1997 | Vanska ........................ 704/261 |
| 5,668,925 A * | 9/1997 | Rothweiler et al. ......... 704/220 |
| 5,717,828 A | 2/1998 | Rothenberg ................ 704/251 |
| 5,729,694 A | 3/1998 | Holzrichter et al. ....... 395/2.17 |

(Continued)

OTHER PUBLICATIONS

Kent, et al., "The Acoustic Analysis of Speech," Singular Publishing Group, pp. 72-86, 1992.

(Continued)

*Primary Examiner*—W. R. Young
*Assistant Examiner*—Michael N. Opsasnick
(74) *Attorney, Agent, or Firm*—Eddie E. Scott; Alan H. Thompson

(57) ABSTRACT

A method and system for speech characterization. One embodiment includes a method for speaker verification which includes collecting data from a speaker, wherein the data comprises acoustic data and non-acoustic data. The data is used to generate a template that includes a first set of "template" parameters. The method further includes receiving a real-time identity claim from a claimant, and using acoustic data and non-acoustic data from the identity claim to generate a second set of parameters. The method further includes comparing the first set of parameters to the set of parameters to determine whether the claimant is the speaker. The first set of parameters and the second set of parameters include at least one purely non-acoustic parameter, including a non-acoustic glottal shape parameter derived from averaging multiple glottal cycle waveforms.

45 Claims, 10 Drawing Sheets

U.S. PATENT DOCUMENTS

| | | | | |
|---|---|---|---|---|
| 5,794,203 | A | | 8/1998 | Kehoe .......................... 704/271 |
| 6,006,175 | A | | 12/1999 | Holzrichter ................. 704/208 |
| 6,055,499 | A | * | 4/2000 | Chengalvarayan et al. . 704/250 |
| 6,081,776 | A | * | 6/2000 | Grabb et al. ................. 704/219 |
| 6,240,386 | B1 | * | 5/2001 | Thyssen et al. ............. 704/220 |
| 6,411,925 | B1 | * | 6/2002 | Keiller ........................ 704/200 |
| 6,415,253 | B1 | * | 7/2002 | Johnson ...................... 704/210 |
| 6,526,139 | B1 | * | 2/2003 | Rousell et al. ......... 379/406.03 |
| 6,526,376 | B1 | * | 2/2003 | Villette et al. .............. 704/207 |
| 6,560,575 | B1 | * | 5/2003 | Keiller ........................ 704/241 |

OTHER PUBLICATIONS

Rabiner, et al., "Digital Processing of Speech Signals," Prentice-Hall signal processing series), 10 pages, 1978.

Kent, et al., "The Acoustic Analysis of Speech," Singular Publishing Group, pp. 72-86, 1992, no moth or day.

Rabiner, et al., "Digital Processing of Speech Signals," Prentice-Hall signal processing series), 10 pages, 1978, no month or day.

* cited by examiner

SPEAKER VERIFICATION SYSTEM USING ACOUSTIC DATA AND NON-ACOUSTIC DATA

RELATED APPLICATIONS

This application claims priority from U.S. Provisional Application Ser. No. 60/252,305, entitled Speaker Verification Using Acoustic and Electromagnetic Sensor Data, filed Nov. 21, 2000.

FIELD OF THE INVENTION

The invention is in the field of mathematical methods and electronic systems for characterizing human speech.

BACKGROUND

At the most fundamental level, a speech signal contains two important pieces of information: information about the content of the speech and information about the speaker. Information about the speaker can be used in speaker identification. There are two types of speaker identification. In the first, the speaker does not claim to be a particular person, but the computer identifies that person given their speech characteristics. This is known simply as speaker identification. The person that is being identified may or may not be aware of the identification. In the second type of speaker identification, the speaker identifies himself in some manner and the computer must verify that identity through the speech characteristics of the speaker. This is defined as speaker verification. Speaker verification is commonly associated with security related access, and the person is usually aware of the verification process.

In speaker verification, error rates are dependent on the selection of a decision threshold affected by the similarity of feature parameters among speakers. Like other speech applications, a speaker verification system accumulates errors through algorithms, processing, approximations, noisy data, etc. Speaker verification makes a binary decision after comparing data collected from a speaker to a training set of data previously collected from the speaker. Each speaker has a training set, a group of feature vector templates, which are recalled when an identity claim is made. The feature vectors are parameters extracted from the speech data. The templates are used to compare to current feature vectors extracted from a test utterance. The verification system must make the decision to accept or reject the identity claim based on a comparison between the test feature vector and template feature vectors.

Prior speaker verification systems relied exclusively on acoustic data collected from a speaker. A microphone captured the speaker's voice and algorithms converted the acoustic data to acoustic feature vectors, or acoustic parameters. One serious problem with an all-acoustic speaker verification system is that it is very susceptible to noise. Errors in verification rise dramatically in the presence of noise either during test feature vector creation, or during verification when the speaker repeats a previously recorded test sentence.

In order to reduce reliance on exclusively acoustic data, equipment has been developed to collect non-acoustic data for use in speaker verification. Low power electromagnetic radar-like sensors have made it possible to measure properties of the human speech production system in real-time, without acoustic interference. This greatly enhances the quality and quantity of information for many speech related applications. For example, see Holzrichter, Burnett, Ng, and Lea, J. Acoustic. Soc. Am. 103 (1) 622 (1998). Electromagnetic micropower speech sensors were developed to characterize the real-time physical movements of a speaker's vocal articulation during speech. For example, see Burnett, G. B., University of California, Davis, "The physiological basis of Glottal Electromagnetic Micropower Sensors (GEMS) and their use in defining an excitation function for the human vocal tract." Ph.D. Dissertation, 1999. Some work has also been done to improve the extraction of traditional speech parameters, such as pitch, by using EM data, for example, Burnett, G. B. Gable, T. J. Ng L. C. and Holzrichter, J. F. "Accurate and noise-robust pitch extraction using low power electromagnetic sensors". 1998.

SUMMARY OF THE DISCLOSURE

A speech characterization method and system are described. Embodiments of the invention use both traditional acoustic data and non-acoustic data to perform speaker identification and verification. In one embodiment, the non-acoustic data is electromagnetic (EM) data characterizing movements of the speakers tissue during speech, for example movement of the tracheal and glottal tissue. In one embodiment, the non-acoustic EM data is collected using a glottal electromagnetic microsensor (GEMS). Speech parameters are extracted using information taken from acoustic data and EM data. The GEMS shape parameter (GSP) is a useful non-acoustic parameter that characterizes the shape of the waveform from the GEMS device. The GSP is based on multiple, averaged glottal cycle waveforms. In another embodiment, the method and system use only EM data and non-acoustic parameters. The acoustic data and non-acoustic EM data streams yield complimentary information about speech, which leads to an improved set of speaker parameters that characterize speech for the purpose of speaker identification, or speaker verification. In one embodiment, the use of EM data produces a speaker verification method and system that is more accurate than previous all-acoustic methods, especially in the presence of noise. In one embodiment, a method for speaker verification includes collecting data from a speaker, wherein the data comprises acoustic data and non-acoustic data. The data is used to generate a template that includes a first set of "template" parameters. The method further includes receiving a real-time identity claim from a claimant, and using acoustic data and non-acoustic data from the identity claim to generate a second set of parameters. The method further includes comparing the first set of parameters to the set of parameters to determine whether the claimant is the speaker. The first set of parameters and the second set of parameters include at least one purely non-acoustic parameter.

DETAILED DESCRIPTION

A speaker verification method and system are described. In various embodiments, non-acoustic data is used to produce parameters characterizing a speaker. In one embodiment, a glottal electromagnetic micropower sensor (GEMS) provides electromagnetic (EM) data that is related to the motions of the tracheal and glottal tissues during speech production. In other embodiments, different non-acoustic data characterizing the speaker is collected using any appropriate equipment. The verification system developed with the EM data includes new and improved features from which the verification decision is based. With the GEMS device, information such as pitch and voicing on/off information is far more accurately and speedily obtained. The EM data also provides features that were previously unobtainable with all-acoustic verification systems. These new verification features lower verification error rates over prior systems, especially in the presence of noise. The EM data is completely immune to acoustic noise. In one embodiment that combines the EM data with acoustic data, an almost 10 fold reduction in error rates from a speaker verification system experiment under a moderate noisy environment (−10 dB) was demonstrated.

Parameters extracted from acoustic data and non-acoustic EM data form a set of feature vectors used in a dynamic time warping algorithm to calculate a performance "distance" that is used to make an accept/reject decision on a speaker's identity claim. Verification parameters represent the individuality of the speaker, containing information about the timing, pitch, amplitude or spectral content of the speech. The GEM sensor provides additional, related noise-free features in addition to traditional acoustic features. These include: GEMS pitch, GEMS shape parameter, or glottal shape parameter (GSP), and auto-regressive and moving average (ARMA) coefficients.

As explained below, a traditional all-acoustic speaker verification system was compared to an embodiment of a system using both acoustic data and EM data. The addition of the purely non-acoustic GEMS shape parameter, or glottal shape parameter (GSP) showed improvements in the range of 700% without noise and up to 920% with noise. These improvements in the GEMS enhanced system make it clear that the GEMS device can improve speaker verification, especially in the presence of noise. This noise immunity of the GEMS makes it applicable for commercial uses where sources of noise made past speech processing difficult, like ATMS, mobile phones, automobiles, and military environments. In addition, the GEMS is a biometric device, as it measures human tissue motion in real time. As such, it makes GEMS-enhanced speaker verification essentially spoof-proof, as a recording is not enough to fool the verification algorithm.

Figure 1:
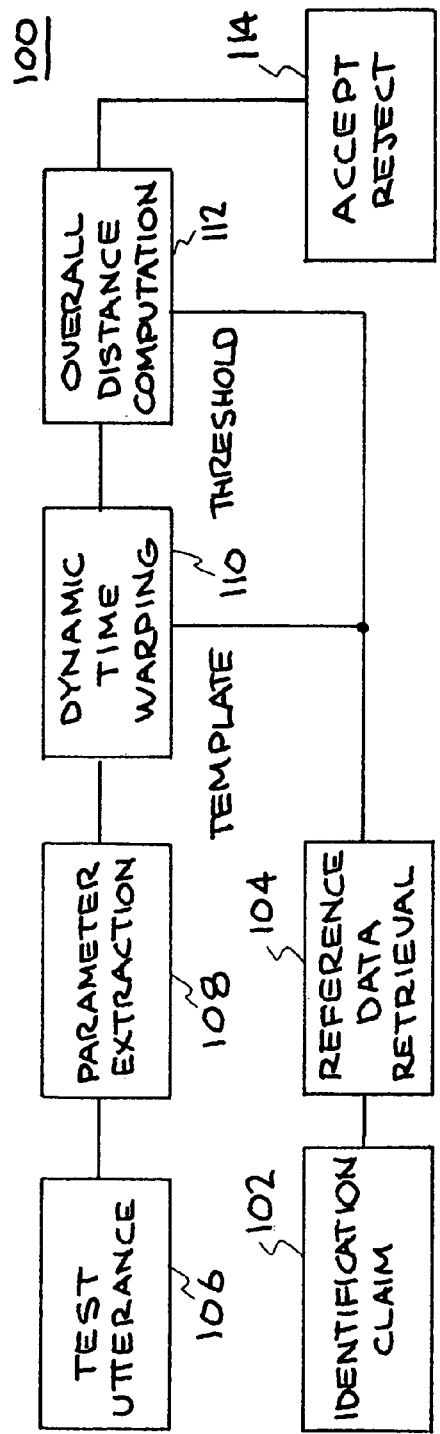
FIG. 1 is a diagram of an embodiment of speaker verification method.

FIG. 1 is a diagram of an embodiment of a dynamic time warping (DTW) based speaker verification process 100. First, at 102, the speaker makes an identity claim, and at 104 a processor retrieves the reference data constructed earlier during a training period. The reference data includes a template and a predetermined threshold value. During training, a test sentence is recorded (106) and algorithms extract the feature vectors (108), also called parameter vectors, from the test utterance. As described below, the parameters include acoustic data and GEMS (non-acoustic) parameters. In addition, acoustic parameters are extracted using EM data to determine cycle boundaries, which reduces frequency domain errors relative to traditional fixed-window techniques. During identity claims by a speaker, the DTW algorithm 110 calculates a "distance" 112, which is based on how different the template vectors and the identity claim vectors are. The distances from the various parameters are statistically combined and an overall distance is compared to a threshold at 114. If the overall distance is less than the threshold, the speaker's identity is verified. If the distance is too high, the speaker's identity is not verified. Further test utterances can be requested and the process repeated if the decision certainty is not high.

Figure 2:
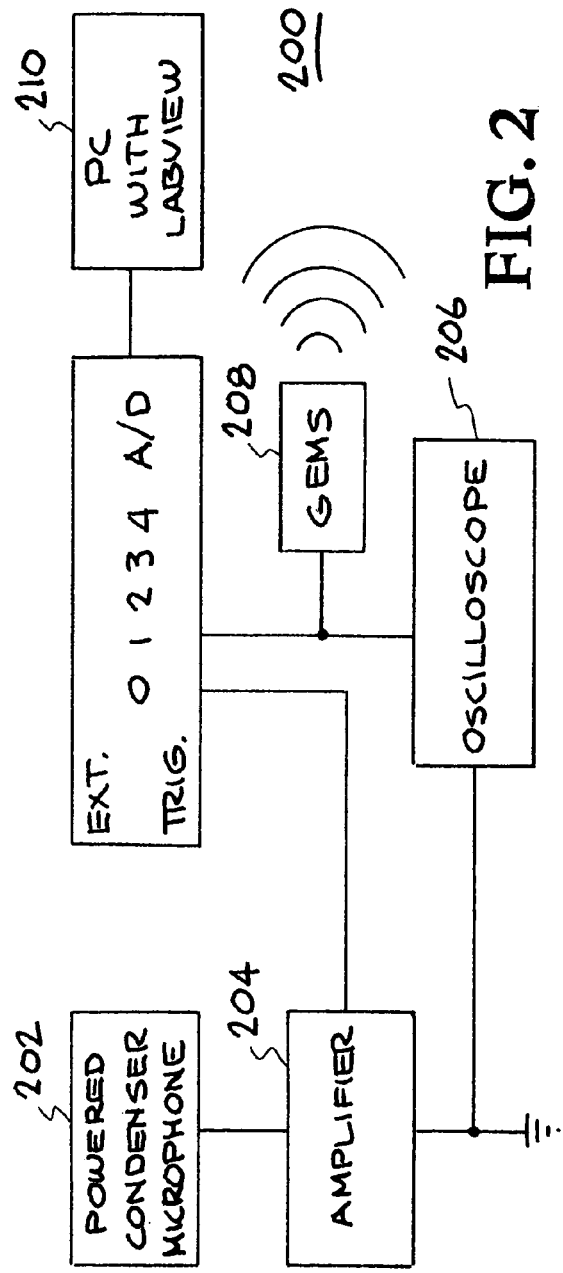
FIG. 2 is a block diagram of an embodiment of a system for collecting and processing data for speaker verification.

FIG. 2 is a block diagram of an embodiment of a system 200 for collecting and processing data for speaker verification. The acoustic data collection is accomplished using a microphone 202 and an amplifier 204. An oscilloscope 206 is used to provide feedback on the GEMS signal to determine whether the GEMS 208 is in the correct position and whether the signal strength is adequate. The data is digitally sampled. In one embodiment, the data is digitally sampled using a National Instruments BNC board connected to a 250 kS/s PC DAQCard. The DAQCard is controlled using Labview 4.0 running on a PENTIUM II laptop 210. The GEMS and microphone data are simultaneously sampled and stored at 40 kS/s per channel with no prefiltering. Analog prefiltering is not used so as not to affect the phase of the EM data. In addition, the GEM sensor output signal is band limited to between 70 Hz and 7 kHz. The high sampling rate of 40 kHz is chosen to eliminate any concerns of aliasing. Typical speech has very little energy above 5 kHz, so the data is low-pass filtered by a digital Chebyshev-II filter with a 3-dB point of 4.9 kHz. The filtered data is then down-sampled twice to 10 kHz.

After the data is filtered, down-sampled and stored on the computer, training templates are formed. The system has a dedicated training set of data for template construction. A set of sentences is chosen, and each speaker must record several repetitions of each sentence for use in training the system. In one embodiment, three of ten repetitions is used as the training set.

Figure 3:
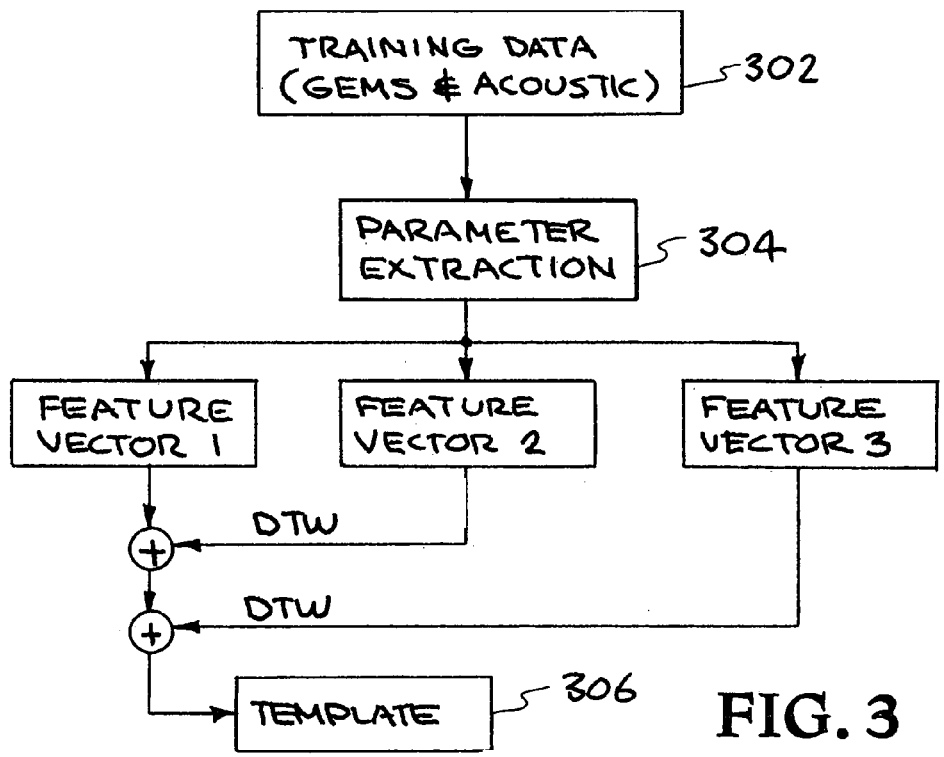
FIG. 3 is a high-level diagram of template construction.

A high-level diagram of template construction is shown in FIG. 3. Training data 302 includes acoustic data and non-acoustic EM data. Parameter extraction 304 extracts a verification parameter from the first three repetitions of each of a set of test sentences, producing three vectors. Two of the parameter vectors are warped to the length of the smallest of the three vectors. In the case of FIG. 3, feature vector 1 would be the shortest vector and is used as the guide vector for the time warping. Averaging operations are represented by plus signs. The resultant feature vector made from the average of all three vectors is the template 306, which is stored for use in verification. Future utterances of the test sentences are scored against templates during verification. The performance of the system can be evaluated by recalling the templates to calculate error rates of the system when a true speaker and several imposters utter the test sentences. In one embodiment, one speaker is the true speaker and there are fourteen imposters. This gives seven data points for the true speaker and 98 imposter points per sentence. These 105 data points are the warping distances calculated using a DTW algorithm. The points are then combined to calculate an overall verification error rate, as discussed more fully below.

An embodiment of the real-time speaker verification system also has auto-updating templates. As the verification system is used, current test utterances are used to update the reference templates.

The theory and method of extraction for each of the different verification parameters for one embodiment will now be discussed. The parameters are the feature vectors used in the DTW algorithm to calculate the "distance" used to make the accept/reject decision on an identity claim. Verification parameters represent the individuality of the speaker, containing information about the timing, pitch, amplitude or spectral content of the speech. In one embodiment, the parameters used are: a pitch parameter extracted using EM data; pitch synchronous spectral coefficients extracted using EM data; energy; pitch synchronous autoregressive and moving average (ARMA) coefficients extracted using EM data; and GEMS signal parameters, which are non-acoustic.

Figure 4:
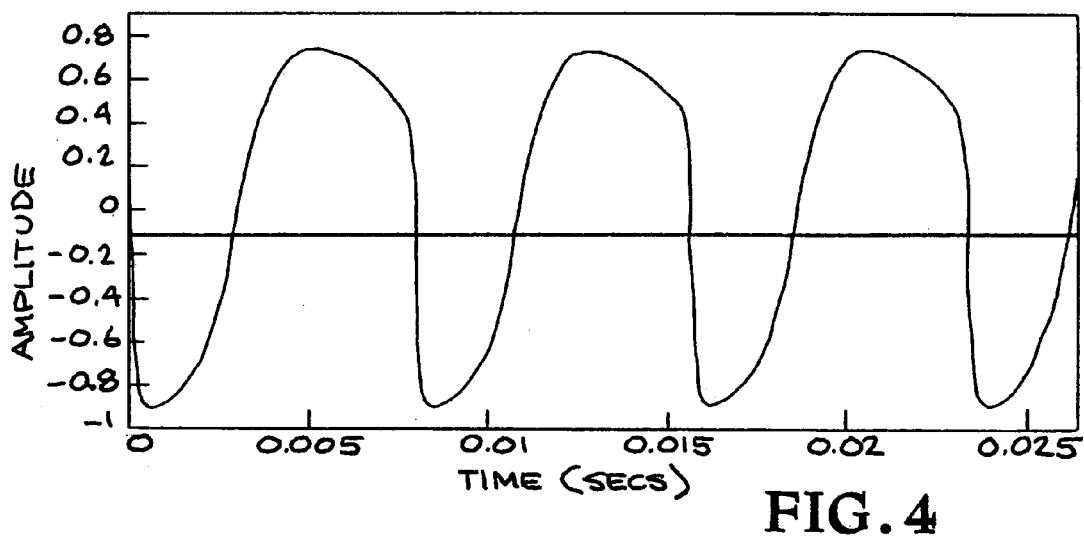
FIG. 4 shows a sample three-glottal cycle graph of glottal electromagnetic micro sensor (GEMS) data.

The use of the GEMS signal enables great speed and accuracy in pitch estimation. FIG. 4 shows a sample three-glottal cycle graph of EM data. The smoothness of the GEMS signal and the linearity of the signal during the positive-to-negative zero crossing allows the use of a simple interpolated zero-crossing algorithm. The algorithm searches for the positive to negative crossing of the signal. In one embodiment, the GEMS pitch algorithm is developed and described by Burnett (1999).

Very little pre-processing or error checking needs to be carried out in the GEMS pitch extraction algorithm. First, the GEMS signal is bandpass filtered with an analog filter with 3-dB frequencies of 70 Hz–7 kHz, which produces the clean signal shown in FIG. 4. The algorithm uses 30 millisecond search windows with no overlap. An energy calculation is done to determine if the speech is voiced or unvoiced. If voiced, the first three zero crossings are calculated and the average pitch for two glottal cycles is determined. The next window begins after the second glottal cycle and the process is repeated. Any anomalous pitch values outside the typical pitch range of 50 Hz–400 Hz are zeroed out. The GEMS pitch algorithm also has the inherent benefit of yielding pitch-synchronous information. The pitch is found via the zero crossings, which represent the closure of the glottis and are therefore natural pitch cycle boundaries. The crossing locations can be used to do pitch synchronous processing, which increases the accuracy of fast Fourier transforms (FFTs). The fairly linear shape of the signal near the zero crossings is also amenable to linear interpolation for a further increase in accuracy of the pitch values. The algorithm also specifies the number of glottal cycles that are averaged to make a pitch estimate. In one embodiment, two cycles are used per pitch estimate, but any number of integer glottal cycles can be used. Two glottal cycles were found to be optimal in pitch estimation because they are long enough to get a smooth pitch contour, yet short enough to capture natural pitch fluctuations.

Short time energy gain is a measurable characteristic of speech. Speakers tend to modulate their speaking amplitude in a somewhat repetitious manner in normal speech. Some speakers start a sentence speaking loudly and end softer or vice versa. It is this variation in amplitude, not the absolute amplitude, which is of interest. The short-time energy of an acoustic signal yields amplitude information. The short-time energy signal is simply the sum of the squared and windowed data. The short-time energy is defined in Equation 1, where n is the window number, m is the time index, x is the signal, and w is the window function.

$$E_n = \sum_{m=-\infty}^{\infty} [x(m)w(n-m)]^2 \qquad 1$$

Because absolute amplitude information is not needed, the audio signal is first normalized to its maximum value. As with the traditional pitch extraction methods, the short-time energy calculation uses a sliding window. In one embodiment, a 30 ms window stepped 10 ms at a time is used. This leads to a 20 ms overlap, which smoothes the resultant short-time energy vector, which is called a gain contour. A gain contour shows amplitude as a function of time.

The value of the amplitude recorded at the microphone is a function of more than just speaking volume. The gain of the recording amplifier and distance from the speaker to the microphone also contribute to the amplitude value. After the normalization, only the relative amplitude of the speech signal remains in the gain contour. Special care must be taken for computing the distance in the DTW algorithm for the gain. The actual values of the gain contour are not needed; only the "shape" of the contour is used for comparing amplitude information between speakers.

Figure 5:
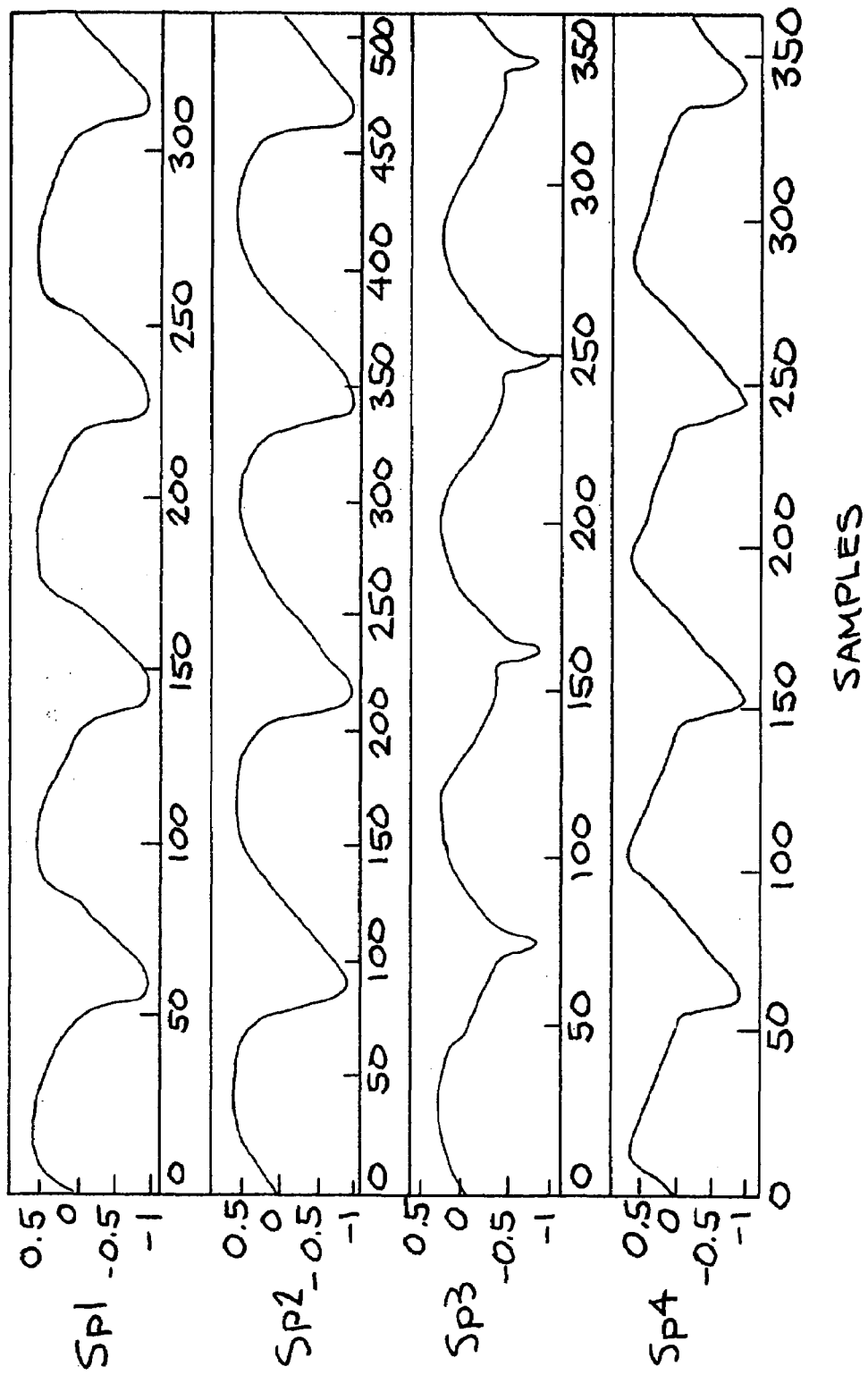
FIG. 5 shows an example of an electromagnetic (EM) signal for a portion of speech for four different speakers.

The GEM sensor allows physical information about the speaker to be captured. The shape of the GEMS output is very distinct for each individual. FIG. 5 shows an example of a GEMS signal for a portion of speech for four different speakers. Each of the speakers' waveforms is unique. Although they share certain qualities like the general shape, subtle differences are seen in the slopes of the waveforms at comparable points, and other variations in shape. Unlike other parameters such as spectral coefficients and pitch, the GEMS signal shape is not time varying. The motions of the glottis and tracheal walls are not different for the different phonemes, although they can vary for different registers of voice. In one embodiment, the normal speaking voice, referred to as the modal or chest register, is used so that variations in register are not a factor. The GEMS signal is related to the excitation pressure of the physical system, which is filtered by the vocal tract to produce the different phonemes. The shape of the GEMS signal changes only briefly during the beginning and ending of phonation. In order to concentrate on the non-varying signal, only samples from the middle of phonation are processed.

A new, non-acoustic parameter is extracted to characterize the shape of the waveform from the GEMS device and compare it to different speakers. In one embodiment, a straightforward method using the GEMS signal shape directly is used. Approaches that use other characterizations, such as wavelets, polynomial coefficients, and the K–L expansion coefficients, are all possible.

Figure 6:
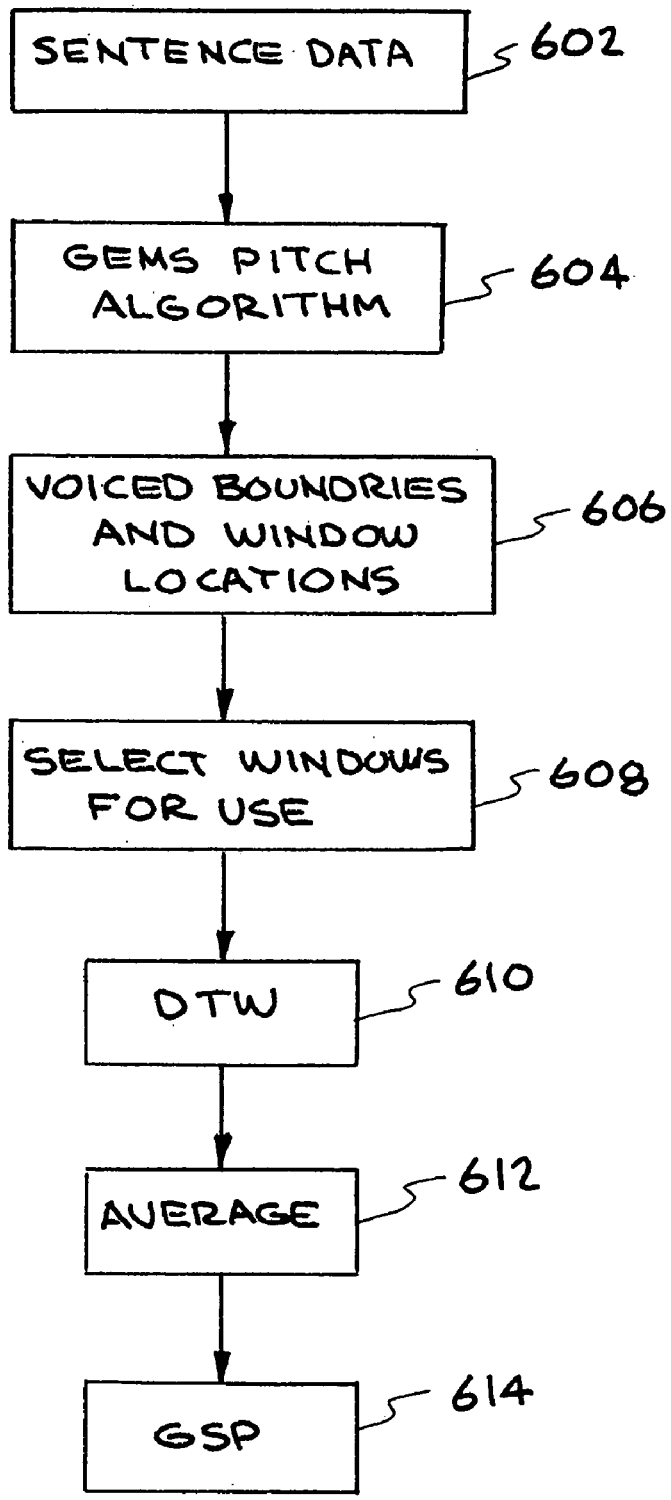
FIG. 6 is a high level diagram of an embodiment of an algorithm to generate a GEMS shape parameter, or glottal shape parameter (GSP).

The GEMS shape parameter, or glottal shape parameter (GSP), in one embodiment, is based on averaged two-glottal cycle waveforms from each sentence data file. In other embodiments, the GSP is based on different numbers of cycles, for example between two and ten cycles. An embodiment of the GSP algorithm is illustrated in FIG. 6. The sentence data 602 is processed by the GEMS pitch algorithm 604. Voiced boundaries and window locations are determined at 606. Windows are selected for use at 608. The selected data is processed by the DTW algorithm at 610. The results are averaged at 612, and the GSP is generated at 614. Many two-glottal cycle waveforms from data file are averaged together to produce one two-glottal cycle waveform. This waveform is the GSP. Many cycles are averaged so as to smooth out any anomalous cycles. Because the GEMS signal is not stable at the onset and offset of speech, the algorithm does not sample any waveforms near the beginning or end of phonation. For example, 6–10 windows from the boundaries are used, and these windows are located by using the voiced/unvoiced boundary information from the GEMS pitch algorithm. The GSP algorithm also separates the waveforms used in the average, so as not to use consecutive two-glottal cycle windows. This eliminates any overuse of anomalous waveforms in the GEMS signal due to speaker or device motion. As with the gain parameter, shape rather than amplitude is the important information, so care is used when choosing a distance calculation for the GSP in the DTW algorithm.

The auto regressive moving average (ARMA) coefficients and their extraction will now be discussed. The ARMA coefficients provide more information than spectral coefficients previously used to model speech. Spectral coefficients, like LPC and cepstral coefficients, estimate the transfer function using only the acoustic signals, which is the output of the linear time-invariant (LTI) system. These methods, while fast, are inherently inaccurate due to a lack of information about the input to the system, which is the voice excitation function. Prior methods make simple assumptions about the input to the LTI system; most commonly assuming the input to the system is white, or spectrally flat. The GEMS signal yields information about the excitation function, or input, while the acoustic signal is the output signal. Together, the input signal and output signal are used in an input-output or pole-zero model. These are often referred to as ARMA models. The ARMA name comes from the model's origin in statistics. The AR (Auto Regressive) part is information from the output. LPC is a very popular AR model. AR models are also called all-pole models, because the numerator of Equation 5 is a constant and only poles are used to model the system. The MA (Moving Average) part is information about the input function and is conversely called an all-zero model because the denominator is unity. An ARMA model uses poles and zeros, both input and output signals to model the system. The ability to measure Y and X from Equation 2 gives access to the class of more accurate ARMA models described next.

ARMA modeling using the audio and GEMS signal can be performed by calculating the transfer function by computing the FFT of the audio and radar and solving for the transfer function. This is illustrated in Equations 2 and 3. This method is known as the empirical transfer-function estimate (ETFE).

$$Y(\omega)=H(\omega)\cdot X(\omega) \qquad 2$$

$$H(\omega) = \frac{Y(\omega)}{X(\omega)} \qquad 3$$

When dealing with random processes, the power spectrum, $P_{xx}$, and cross spectrum, $P_{xy}$, are used instead of the direct Fourier transform. The Fourier transform is not an accurate representation of the statistical nature of a random process. The power and cross spectrums more accurately represent the frequency content of a random process. The transfer function based on $P_{xx}$ and $P_{xy}$ becomes $H_{xy}$ as defined in Equation 4.

$$H_{xy}(\omega) = \frac{P_{xy}(\omega)}{P_{xx}(\omega)} = \frac{\sum_{-\infty}^{\infty} e^{-jwt}}{\sum_{-\infty}^{\infty} e^{-jwt}} \qquad 4$$

Where $r_{xy}$ and $r_x$, are the cross-correlation and autocorrelation respectively. Equation 4 yields an estimate of the transfer function. It is discrete with a length equal to that of the widow used in the transformation. This is normally too long to be of any use, so a parameter form of H is needed. To achieve this a least-squares fit to the raw discrete transfer function is be used. Equation 5 shows a rational polynomial fit to the raw transfer function, H(z).

$$H(z) = \frac{B(z)}{A(z)} = \frac{b(1) + b(2)z^{-1} + \ldots + b(N_b + 1)z^{-N_b}}{a(1) + a(2)z^{-1} + \ldots + a(N_a + 1)z^{-N_a}} \qquad 5$$

The ETFE assumes nothing about the system other than linearity. A problem in Equation 4 may arise if $P_{xx}(\omega) \approx 0$ and measures must be taken to prevent this. One method is to let $H(\omega)$ be undefined at these frequencies. A preferable method is to add a small constant to $P_{xx}(\omega)$, which corresponds to adding a small amount of white noise to the input signal, x(t), to insure the stability of $H(\omega)$ at the problematic frequencies.

The ETFE is a rough approximation of the transfer function. It works best with periodic inputs, where the variance decays like 1/N, where N is the total number of points or frequency bins for $H(\omega)$. When the input comes from a stochastic process the variance does not decrease with N. There are smoothing methods available that can improve the ETFE. It is preferable, however to use the following parametric LTI models, which are superior to ETFE models, even with smoothing.

Parametric linear models use information about the system to minimize the least squares residual. The parametric family of models represents the transfer function as a rational function with the parameters being the coefficients of the numerator and denominator. This is a linear difference equation in the time domain, the simplest form being Equation 6.

$$y(n) = \sum_{i=1}^{N_a} a_i y(n-i) + \sum_{j=0}^{N_b} b_j u(n-j) + e(t) \qquad 6$$

Figure 7:
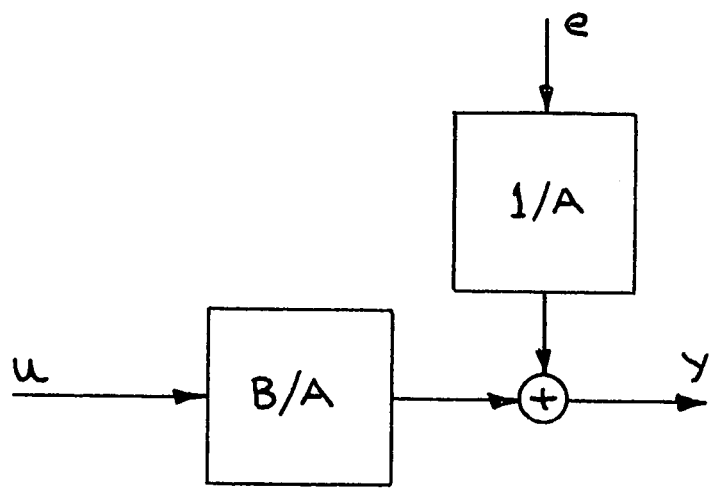
FIG. 7 shows a structure for an auto regressive with extra input (ARX) model.

Here y is the output, u is the input, $a_i$ and $b_j$ are the coefficients, and $N_x$ is the model order (number of poles and zeros). This model structure is known as the auto-regressive with extra input (ARX) model or the output error model (Ljung 1987). The structure of ARX is shown in FIG. 7 below. FIG. 7 shows how the input u, output y, and noise e are related via the rational polynomials (A and B) that describe the transfer function.

The ARX model is part of a larger family of parametric linear ARMA models. This family consists of 32 models differing in the five polynomials, A, B, C, D and F, used to describe the system. The most general system is shown in Equation 7. The major differences in the models relate to how the system noise is modeled. ARX is the simplest model in the family, as the noise is just additive white noise, as seen in Equation 6.

$$A(z)y(t) = \frac{B(z)}{F(z)}u(t) + \frac{C(z)}{D(z)}e(t) \qquad 7$$

The performance of the different parametric models was examined, and the ARX model was chosen as an appropriate model to use for speaker verification. Other models, such as the "ARMA with extra input" (ARMAX) model can also be used. Each speech application has specific requirements that must be fulfilled by the model chosen. For example, speech synthesis requires a very good model fit to ensure accurate and understandable synthesized speech. Thus higher order and more complex models are used. Another application is digital communications, which requires speech to be parameterized and transmitted, via wireless or wired networks. Minimization of bandwidth is important for transmission since a continuous stream of data must be sent on finite bandwidth channels. Lower model order and less model parameters for low bandwidth transmission are obtained at the cost of less accurate speech reproduction. This is the case for most digital cell phones, sometimes resulting in less than desirable speech reproduction.

Speaker verification also has a set of criteria for system modeling. A low model order leads to little transfer function information and not enough differences when comparing speakers. A high model order can lead to too much detail in the transfer function and the modeling of noise. Since speaker verification works directly with the coefficients from the difference equation (Equation 6), a lower verification error rate will result if the $a_i$ and $b_j$ are reproducible for same the phoneme. It is possible that different values of the parameters for a given model type and order might lead to a similar transfer function for the same phoneme. This problem is referred to as the lack of robustness of the model coefficients. Two sets of input and output waveforms, which differ only slightly, should yield ARMA parameters that differ only slightly. If a small change in the waveforms leads to a large variation in the coefficients, the model is not robust and therefore not very useful for verification.

There are many options available to an engineer building a discrete model of a physical system. The most common ones are model type, model order and system delay. There must also be criteria for what is "good enough" for the desired application. For example, an accurate model can be more important than an efficient one in some cases. Bandwidth can be the primary design goal. In this case a more limited and less accurate model might be acceptable.

Using a linear time invariant (LTI) approximation, such as the ARX model of the vocal tract, is justified because it adequately models the system of interest for short time constants. It was also discovered through experimentation that the electronic and background noise is relatively simple and can be assumed to be white without introducing significant modeling errors. It was also found that the simplest parametric ARMA model, the ARX model, is more than adequate to describe the behavior of the system of interest. The approximate number of resonances and nulls (poles and zeros) of the vocal tract has been estimated at about 5–7 resonances and 1–2 nulls. Because it takes two poles or zeros per resonance (complex conjugates pairs), a minimum of roughly 10–14 poles and 2–4 zeros are needed to model the system. In one embodiment, twelve poles ($a_i$) and four zeros ($b_j$) are used. This number of parameters produces a good model fit without imposing a large burden on the processor for the calculation.

The relatively low speed of sound introduces a delay in the output of the system (i.e., the sound measured by a microphone) when compared to the GEMS-derived input, as the GEMS operates at the speed of light. The model should take this delay into account when modeling the system. For example, in one instance, the vocal tract for males is about 17 cm and the distance to the microphone is relatively constant at about 30 cm. With a speed of sound of approximately 330 m/s, the total path length of 47 cm takes about 1.4 milliseconds (or 14 samples at 10 kHz) to traverse. Several delays from zero to 20 samples were tested, and a delay of 8 samples (8 ms) was found to have the lowest residual by the ARX algorithm.

Figure 8:
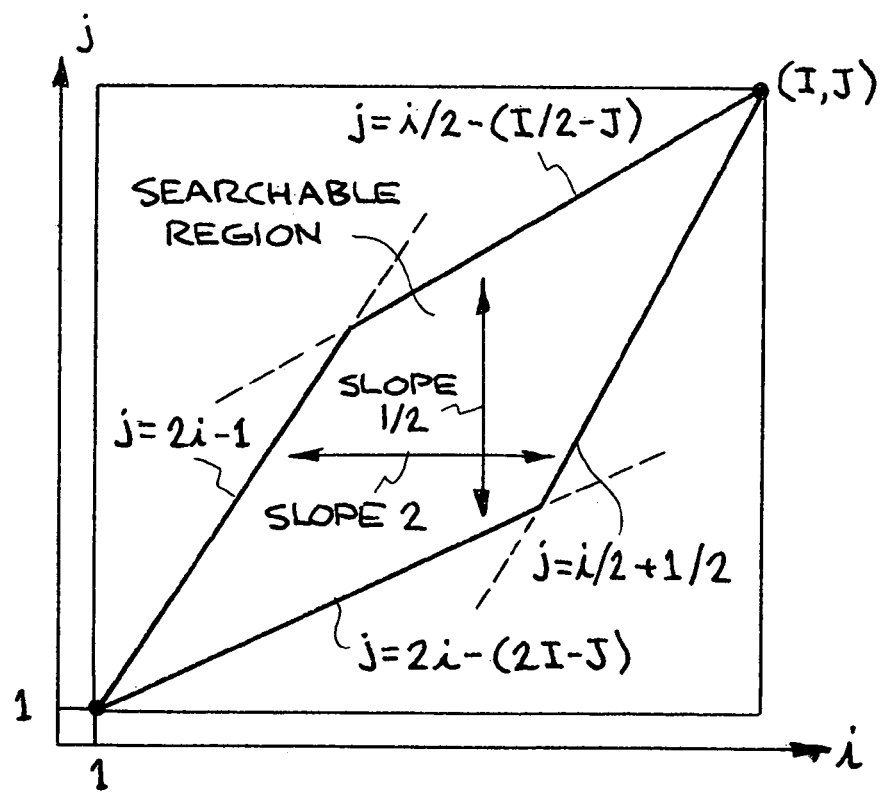
FIG. 8 shows global path constraints and the searchable area produced in one embodiment of dynamic time warping (DTW).

Dynamic time warping (DTW), as used in embodiments of the method and system, will now be discussed. DTW is a non-linear method of expanding or contracting one vector to match the length of another vector. The output of the DTW algorithm is a warped vector and a warping distance. This warping distance is the basis of the verification decision. DTW is used to match the features of two discrete parameter vectors optimally and determine the global warping distance between the vectors. The warping distance is a sum of the optimal local path distances and it is used as a comparison of the two vectors. The warping problem can be thought of as an optimal path finding problem in a rectangular grid. It begins with two vectors, also called contours, one being the guide vector and the other being the test vector. The test vector is warped to the length of the guide vector, which does not change in any manner. For grid construction, the guide vector is lined up on the y-axis and the test vector on the x-axis. Let the guide vector be length J while the test vector is length I. The resultant grid (or matrix) is of size I·J. The y-axis goes from 0→J while the x-axis goes from 0→I. The warping path goes through the grid starts at point (0,0) and ends at (I,J). FIG. 8 shows global path constraints and the searchable area produced.

The DTW algorithm used in speech is different from other applications in that some optimal paths may not be physically realizable for human speech and thus measures must be taken to avoid bad warpings. The DTW algorithm therefore contains many constraints, which dictate what warping paths are allowed and how each path distance is calculated. Each constraint will be discussed along with how it was chosen.

The first constraint is monotonicity. Monotonicity states that the warping path must take a "future" direction, or $i_{k-1} \leq i_k$ and $j_{k-1} \leq j_k$. Physically this means that the warping path does not go back in time, so that features in the test waveform cannot be matched to features in the guide waveform earlier in time than features, which have already been matched. Monotonicity is necessary for warping speech data, as causality must be maintained.

Endpoint constraints require that the beginnings and ends of the test and guide vectors are matched to each other, as illustrated in Equation 8 at the tips of the trapezoid. This is done by matching the first and last data points in the guide vector to the first and last point in the test vector. Flexibility can be allowed if the beginnings and ends are somewhat unknown, due to noise or unvoiced/voiced detection errors. This will be discussed with reference to global path constraints below.

$$i_{k=1}=1 \quad j_{k=1}=1$$

$$i_{k=K}=I \quad j_{k=K}=J \qquad 8$$

Global path constraints restrict the allowed area of the grid that the DTW algorithm is allowed to search for the optimal warping path. Eliminating areas of the grid can speed up processing by a factor of 3. The global path constraint used in one embodiment is called the Itakura constraint. The Itakura constraint sets the "legal" search range to no more than a factor of two. Compression of no less than factor of one half and an expansion of no more than a factor of two is allowed. Instead of searching I·J grid points, the parallelogram search area in FIG. 8 limits it to roughly [I·J]/3 grid points. This constraint eliminates massive warpings where the test and guide vectors are simply too different to warp. A warping distance of infinity is then assigned to these "illegal" warpings.

The global path constraints shown in FIG. 8 are known as "fixed endpoint". With these constraints the warping path begins and ends at a single point, which are the first and last component of the input vectors.

Figure 9:
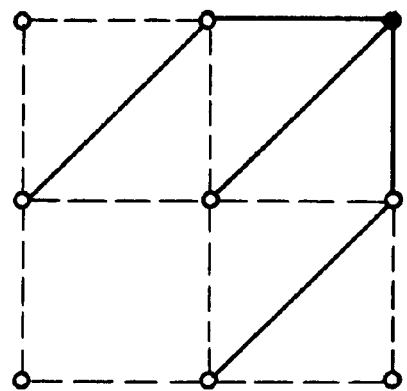
FIG. 9 shows how local path constraints restrict the steps the warping path can take from node to node through the grid in the DTW algorithm.

Related closely to the global path constraints are the local path constraints. Local path constraints restrict the steps the warping path can take from node to node through the grid, as shown in FIG. 9, in which the final point is filled in. This limits the amount of compression or expansion of the test vector in a small neighborhood around the current node on the warping path. The local path constraint shown in FIG. 9 is used in embodiments of the method and system, and was developed by Myers (see Myers, C., Rabiner, L. R. and Rosenburg, A. E., "Performance tradeoffs in dynamic time warping for isolated word recognition", IEEE Transactions on Acoustic, Speech and Signal Processing, Vol. ASSP-28, No. 6, December 1980).

Transition cost refers to the weighting each path in the local path constraint is assigned. There are several different weighting schemes and their purpose is to discourage paths that diverge too much from a linear warping path in a local region. While the details will not be discussed here, for completeness, four known types of weighting schemes are stated below (Equations 9–12).

Type (a) $T[(i_{k-m},j_{k-m})|(i_{k-m-1},j_{k-m-1})]=\min\{i_{k-m}-i_{k-m-1},j_{k-m}-j_{k-m-1}\}$  9

Type (b) $T[(i_{k-m},j_{k-m})|(i_{k-m-1},j_{k-m-1})]=\max\{i_{k-m}-i_{k-m-1},j_{k-m}-j_{k-m-1}\}$  10

Type (c) $T[(i_{k-m},j_{k-m})|(i_{k-m-1},j_{k-m-1})]=i_{k-m}-i_{k-m-1}$  11

Type (d) $T[(i_{k-m},j_{k-m})|(i_{k-m-1},j_{j-m-1})]=[i_{k-m}-i_{k-m-1}]+[j_{k-m}-j_{k-m-1}]$  12

Figure 10:
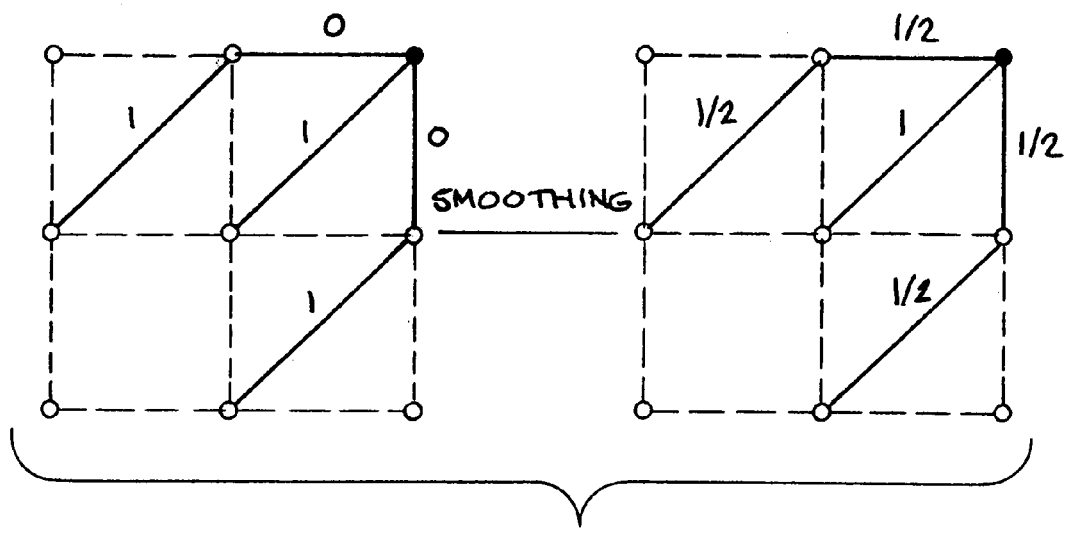
FIG. 10 shows the distance smoothing of the local transition cost in the DTW algorithm.

Some transitions and local path constraint combinations can lead to cost free and anomalous paths. To reduce this effect, the transition cost can be smoothed. The cost along the path segments is replaced by the average cost along the path. FIG. 10 shows the distance smoothing of the local transition cost, in which the final point is filled in.

The distance function being minimized in the DTW algorithm takes the form:

$$\tilde{D} \stackrel{def}{=} \frac{\sum_{k=1}^{K} d[(i_k,j_k)|(i_{k-1},j_{k-1})]}{\sum_{k=1}^{K} d_T[(i_k,j_k)|(i_{k-1},j_{k-1})]} \qquad 13$$

The denominator in Equation 13 is the normalization function, which is needed to get the distance into a cost per node basis. Since the chosen weighting is path-dependent, a true normalization is impractical to calculate. Hence, the arbitrary normalization of I, the length of the test vector, is chosen as the normalization. Since the weightings in Equation 11 and 12 are path-independent, it can be shown that the calculated normalization is I and I+J.

$$I = \sum_{k=1}^{K} d_T[(i_{k-m},j_{k-m})|(i_{k-m-1},j_{k-m-1})] = \sum_{k=1}^{K} i_{k-m}-i_{k-m-i} \qquad 14$$

$$I+J = \sum_{k=1}^{K} d_T[(i_{k-m},j_{k-m})|(i_{k-m-1},j_{k-m-1})] = \qquad 15$$

$$\sum_{k=1}^{K} i_{k-m}-i_{k-m-1}+j_{k-m}-j_{k-m-1}$$

The arbitrary normalization for transition costs Type (a) and (b) (Equations 9 and 10) lead to a bias towards longer paths (away from a linear path) for the Type (a) and a shorter path (towards the linear) for Type (b). The potential errors from the bias do not have any substantial effect on the verification errors, as shown in Myers (1980). Transition cost Type (a) was used in one embodiment.

The DTW algorithm is a brute-force numerical method, in that it searches all paths inside the given grid for an optimal path. There are many subtle variations that may be made to the algorithm. Discussed above are the global and local path constraints, unconstrained and constrained end points, and the different weighting schemes. Although all the different constraints are not discussed, the use of various, different constraints is also possible.

Dynamic time warping of large vectors is computationally expensive. It is important to consider constraints that cut the computational load, such as global path constraints. Using constrained endpoints can speed up the search by nearly a factor of three. There are tradeoffs to consider such as eliminating the searchable area and introducing errors in warping. In general, the optimal warping path is nearly linear. Therefore, errors caused by narrowing the search area are negligible, and the computational costs can be significantly reduced. In one embodiment, the common constraints discussed above were used, at least in part because they were proven to be fast and they performed well.

As previously explained, the output of the DTW algorithm is a warped vector and a warping distance. This warping distance is the basis of the verification decision. Commonly, a warping distance threshold is chosen such that the false acceptance error and the false rejection error are substantially equal. This is done to facilitate comparisons between verification systems and is known as the equal error rate (EER). Each verification parameter, or feature vector, has its own individual EER based on the distance measure comparing the warped feature vectors. The individual distances are then used together to make an accept/reject decision. There are many different methods that can be used to get an overall EER by which to evaluate a speaker verification method and system. The method used in one embodiment of the method and system is a linear classifier that is part of a larger class of parametric classifiers and is an approximation to the Bayes classifier. A short summary of the linear classifier used follows below. A comprehensive description of the Bayes classifier and associated techniques can be found in the literature.

The field of pattern recognition tries to determine to which category a sample belongs. Assume an observation vector, X, is random and has a conditional density function which depends on its class. Also assume there are two classes, $w_1$ and $w_2$, which X can belong to. The conditional density functions (CDF) and the a priori probabilities are also assumed to be known. The a posteriori probability, $q_i$, of $w_i$ given X can be calculated from the a priori probability using Equation 16 which is referred to as Bayes theorem.

$$q_i(X) = \frac{P_i p_i(X)}{p(X)} \qquad 16$$

Where p(x) is the mixture density function, $P_i$ is the a priori probability and $p_i(X)$ is the conditional density function. Equation 17 shows the decision rule based on probabilities. If the probability of $w_1$, given X is larger than the probability of $w_2$ then X is classified to $w_1$, and vice versa. Using Equation 16, the decision rule in Equation 17 can be rewritten as in Equation 18 and Equation 19.

$$q_1(X) \underset{\omega_2}{\overset{\omega_1}{\underset{<}{>}}} q_2(X) \qquad 17$$

$$P_1 p_1(X) \underset{\omega_2}{\overset{\omega_1}{\underset{<}{>}}} P_2 p_2(X) \qquad 18$$

$$l(X) = \frac{p_1(X)}{p_2(X)} \underset{\omega_2}{\overset{\omega_1}{\underset{>}{<}}} \frac{P_2}{P_1} \qquad 19$$

The term l(X) is called the likelihood ratio and $P_2/P_1$ is called the threshold value of the likelihood ratio. Equation 19 and its variants are the basis for Bayes decision theory and form the basis of the Bayes linear classifier used in embodiments.

The Bayes likelihood ratio test is optimal in the sense that it minimizes the probability of error. The likelihood ratio relies on having the CDF for all classes. This is not normally possible and an estimation of the CDF is used for some applications. The estimation is a complex procedure and requires many samples to get accurate results. The Bayes classifier (likelihood ratio test) is the best classifier in all cases.

The Bayes linear classifier assumes there are two normal distributions for optimal classification performance and leads to a quadratic function in X for the decision equation (Equation 20). $C_x$ is called the correlation matrix and the $M_i$ is the mean of class i from X. Equation 21 gives the final form of the classifier used in this work and only differs from Equation 20 by an additive constant (the third term in Equation 20) and factors of ½ absorbed into $T_{EER}$. For use in verification, Equation 4.14 maps the multiple verification distance vectors (which have imposter and customer distances) into one vector, which is searched for the threshold that gives the equal error rate (EER), called $T_{EER}$ here. The linear classifier is a simple method for combining many verification parameter results to calculate one overall system EER.

$$\frac{1}{2}(X - M_1)^T C_{x_1}^{-1}(X - M_1) - \qquad 20$$

$$\frac{1}{2}(X - M_2)^T C_{x_2}^{-1}(X - M_2) + \frac{1}{2}\ln\frac{|C_{x_1}|}{|C_{x_2}|} \underset{\omega_2}{\overset{\omega_1}{\underset{<}{>}}} \ln\frac{P_1}{P_2}$$

$$(X - M_1)^T C_{x_1}^{-1}(X - M_1) - (X - M_2)^T C_{x_2}^{-1}(X - M_2) \underset{\omega_2}{\overset{\omega_1}{\underset{<}{>}}} T_{EER} \qquad 21$$

Although the Bayes linear classifier is an approximation to the optimal Bayes decision rule, it performs very well in the method and system for speaker verification.

The performance of the speaker verification system can be measured by two error rates, the false rejection rate (FRR) and the false acceptance rate (FAR). The former is the error rate pertaining to the rejection of the true speaker and the latter refers to the acceptance of an imposter. The value of the distance threshold from the DTW algorithm determines the values of the two errors. Setting the threshold high leads to a smaller false rejection error and a large false acceptance error. Conversely, a low threshold will lower the false acceptance error while making the false rejection error large. Some verification applications put more importance on minimizing one type of error over the other. For example, a verification system, which controls entrance into a high security government building, may want a very small FAR at the expense of a larger FRR. On the other hand, some applications may value ease of use over security and will require a low FRR. The same verification system can be used in both cases, but with very different thresholds.

Figure 11:
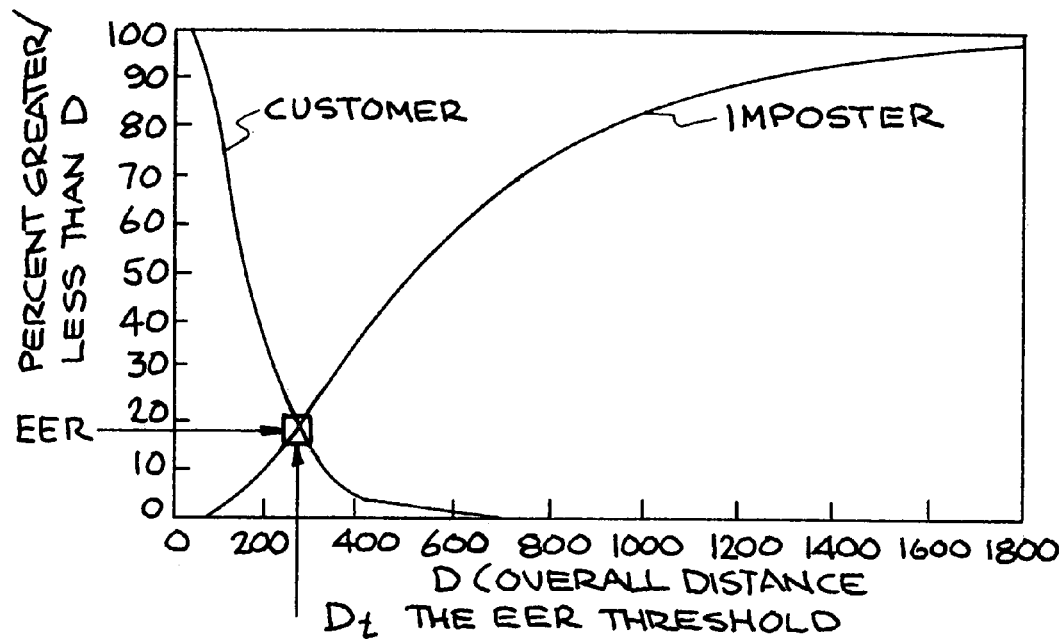
FIG. 11 is a sample of a cumulative distribution function (CDF) for DTW distances found using the GEMS pitch parameter.

In order to easily compare different verification systems, a measure known as the equal error rate (EER) is often used. The EER is found by setting the threshold that makes the two errors (FRR and FAR) equal to each other. By plotting the cumulative distribution functions (CDF) of the DTW distances for the customer and imposter data, the EER can be found at the intersection of the two CDFs. FIG. 11 is a sample of a CDF for distances found using the GEMS pitch parameter.

The EER was used as the measure of performance for the speaker verification method and system. A perfect verification system would have a 0% EER, that is, no errors of either type. This is naturally the ultimate goal of any verification system. Each feature vector or parameter has its own EER and they can be combined via the Bayes classifier as previously described get one overall EER. The overall EER (hereafter referred to simply as the EER) can be used as a direct performance gauge for different methods and systems. Also, it is sometimes desired to calculate the EER to measure the effect of a change in the system, such as changing a variable in an algorithm.

Embodiments of the speaker verification method and system were compared to traditional all-acoustic methods and systems using EER. In the "comparison experiment", three of the twelve sentences were used in the final results.

The template vector was used as the guide vector. Shorter vectors can be used, but they were found to produce slightly higher EERs, as shown in Table 1.

TABLE 1

EER for different guide vectors (all speakers and all sentences used).

| Feature Vector | EER - Shorter vector as guide | EER - Template vector as guide |
|---|---|---|
| Autocorrelation Pitch | 16.5% | 15.1% |
| GEMS Pitch | 18.7% | 17.8% |
| Gain | 32.1% | 31.8% |

The different types of endpoint constraints have already been described. Constrained endpoints were used for the comparison experiment.

Extracting and using all of the spectral coefficients and their derivatives is not practical in verification, and would not be practical in the comparison experiment. For example, twelve cepstral and delta-cepstral coefficients and eleven ARMA and delta-ARMA coefficients at every data window would lead to over forty feature vectors. Forty feature vectors would require far too much computer processing for DTW and classifier algorithms. Four to eight optimized verification parameters are considered to be sufficient for good speaker verification. In experiments, the overall EER became very small with six or more feature vectors. Therefore, for the comparison experiment, only two spectral coefficients and their corresponding time derivatives were used.

A method of reducing the number of parameters had to be found. Direct measurement of the EER was chosen as a method to reduce the number of parameters.

Table 3 shows the EER for the twelve extracted cepstral coefficients (CC) and eleven ARMA $a_i$, labeled As, for sentences 1–3. The EER is lowest for the first parameter in both cases and increases almost linearly for subsequent parameters. This trend was also observed for the delta parameters. As seen in Table 2, $CC_1$ and $As_2$ have the lowest EER and are thus the best coefficients if used alone for verification. Cepstral coefficients (and spectral coefficients in general) are not linearly independent with respect to each other; they contain overlapping information. Since a dependence exists between coefficients, it was found that coefficients that were not consecutively numbered performed better when combined in the classifier. One method to find the best pair of coefficients is to test the performance of all pairs of coefficients in the classifier and examine the EER. This would require on the order of $N^2/2$ computations of the EER using the Bayes classifier, where N is the total number of spectral coefficients extracted. Another method that is much quicker but is somewhat arbitrary is to pick two coefficients, which are far apart, for example pick $CC_2$ and $CC_{10}$.

TABLE 2

EER for individual CCs and ARMA As

| CC # | EER (%) | As # | EER (%) |
|---|---|---|---|
| 1 | 12.8571 | 2 | 9.3311 |
| 2 | 13.1859 | 3 | 11.3832 |
| 3 | 14.0363 | 4 | 11.0431 |
| 4 | 14.0136 | 5 | 9.8413 |
| 5 | 13.8549 | 6 | 12.6757 |
| 6 | 13.7415 | 7 | 13.7302 |
| 7 | 15.1701 | 8 | 9.8753 |
| 8 | 17.0635 | 9 | 14.6712 |
| 9 | 18.6621 | 10 | 17.5057 |
| 10 | 20.5556 | 11 | 16.4739 |
| 11 | 20.8617 | 12 | 14.5238 |
| 12 | 21.0317 | | |

Figure 12:
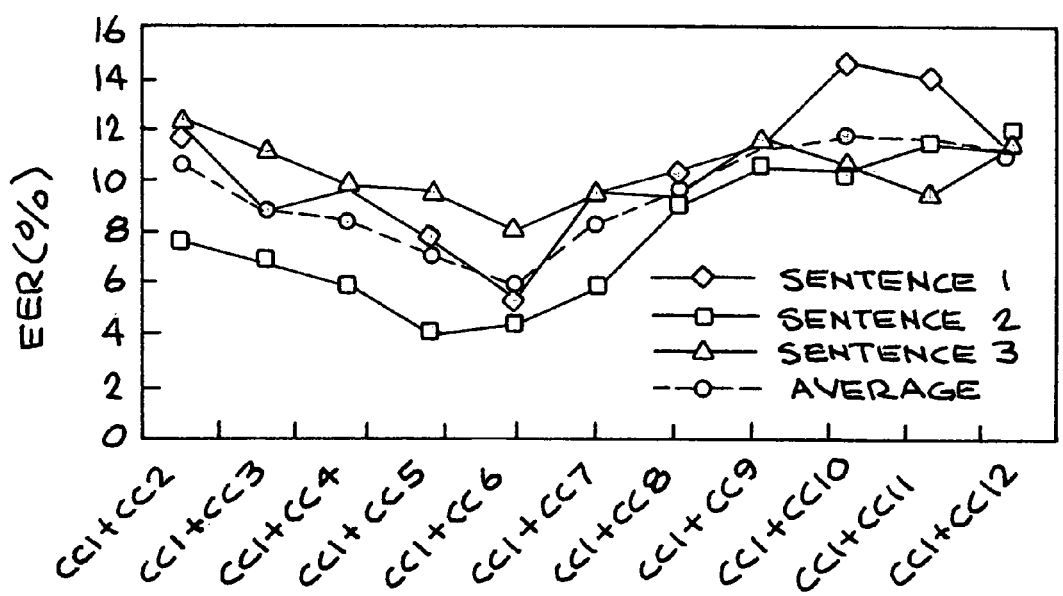
FIG. 12 shows equal error rate (EER)for a method of choosing pairs of cepstral coefficients.
Figure 13:
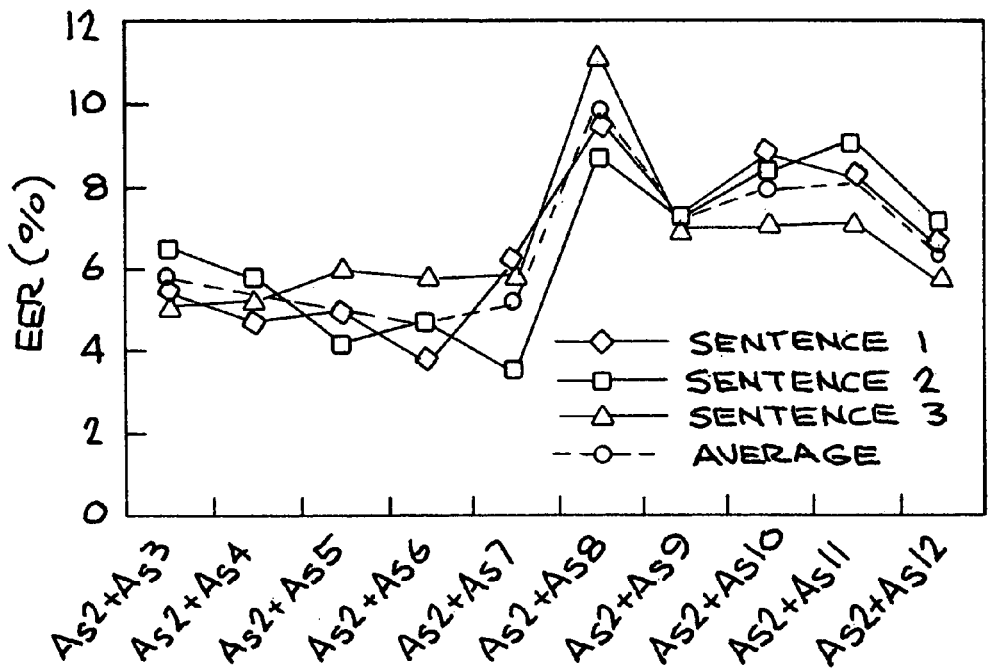
FIG. 13 shows EER for a method of choosing pairs of auto-regressive and moving average (ARMA) coefficients.

Another adequate method is a compromise of the two methods described above. The best performing single coefficient from each column of Table 2 can be picked, e.g., $CC_1$ and $AS_2$, and the task is then to find an optimal second coefficient to pair with them. This essentially reduces the search from order $N^2$ to a search of order N. FIG. 12 and FIG. 13 show the EER results of this method of choosing pairs of coefficients using the Bayes classifier. FIG. 12 shows EER for pairs of cepstral coefficients, and FIG. 13 shows EER for pairs of ARMA coefficients (As).

Using the average of the three sentences, the optimal second coefficients were found to be $CC_6$ and $As_6$. This method gives a good indication of which two spectral coefficients minimize the EER in the Bayes classifier. It is by no means comprehensive, as it does not test all possible pairs. However, it is better than picking two coefficients that have low individual errors or that are far apart in terms of the coefficient number. The method described above is systematic and far less time consuming. While optimizing for the lowest EER is important, achieving the lowest possible error rate at any expense was not a goal. This method favors neither type of speaker verification system (acoustic or acoustic/GEMS), is systematic, and performs well.

The performance of the verification parameters will now be summarized on an individual basis. The results for the spectral coefficients are limited to $CC_1$, $CC_6$, $As_2$ and $As_6$ and their respective time derivatives, the optimal combinations described above. These were found to be optimal coefficients as previously described. Although the individual EERs are important, it is how they combine via the classifier that shows the ultimate usefulness of each parameter. Parameters with large errors may not seem to be of much use, but if they contain statistically independent information they can contribute to lowering the EER.

TABLE 3

Equal error rates for individual verification parameter.

| Acoustic | EER (%) | GEMS based | EER (%) |
|---|---|---|---|
| Pitch | 15.14 | Pitch | 14.82 |
| CC1 | 12.86 | As2 | 9.33 |
| CC6 | 13.74 | As6 | 12.68 |
| dCC1 | 14.52 | dAs2 | 16.11 |
| dCC6 | 22.79 | dAs6 | 18.36 |
| Gain | 27.74 | GSP | 43.03 |

The results in Table 3 show that spectral coefficients perform well. The short-time energy (gain) and the GEMS Shape Parameter (GSP) alone are relatively poor verification parameters, but they do play a role in lowering the final EER using the Bayes classifier, as seen further described below. Importantly, the GEMS has the distinct advantage of being immune to acoustic noise since it is an electromagnetic device. Generally, speech processing is very sensitive to ambient noise, such as the hum from a computer or unwanted speech from nearby speakers. This makes useful speaker verification or speech recognition difficult for real world environments like a bank ATM machine or on a mobile phone in a moving vehicle.

Two types of common noise were used to compare the two verification systems. The first type was white noise, which is spectrally flat, containing all frequencies with equal amplitude. White noise is indicative of a generic class of background noise, representing many types of noise mixed together. An example might be a room with office machines and a freeway nearby, though this noise would only be approximately white because specific sources have peaks in their spectra. For example, computer power supplies have noise power peaks at 60 Hz and 120 Hz caused by the conversion of AC power to DC. To test the robustness of the GEMS enhanced parameters in the presence of noise, acoustic noise was digitally added to the audio files. The noise is 10 dB down in amplitude with respect to the speech data (10 dB SNR). The noise level represents a reasonable amount of noise for real world applications.

The second type of noise is speech noise. It is often referred to as cocktail noise, and will be referred to as cnoise. Cocktail noise is the background chatter you might hear if many speakers where conversing in close proximity. The cnoise was constructed with a speaker not in the database. The voice was added and overlapped digitally at 10 dB down from the real speech to simulate many incoherent speakers. This type of noise is especially detrimental to pitch algorithms since most of the power of the noise is in the same frequency range as the real pitch.

Figure 14:
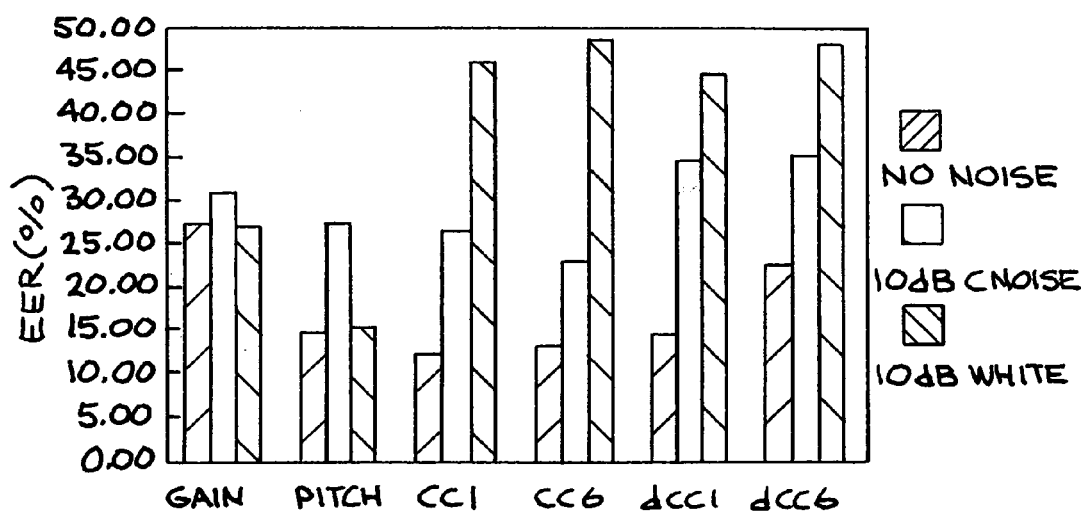
FIG. 14 shows the error rates for those parameters affected by the noise from Table 4.
Figure 15:
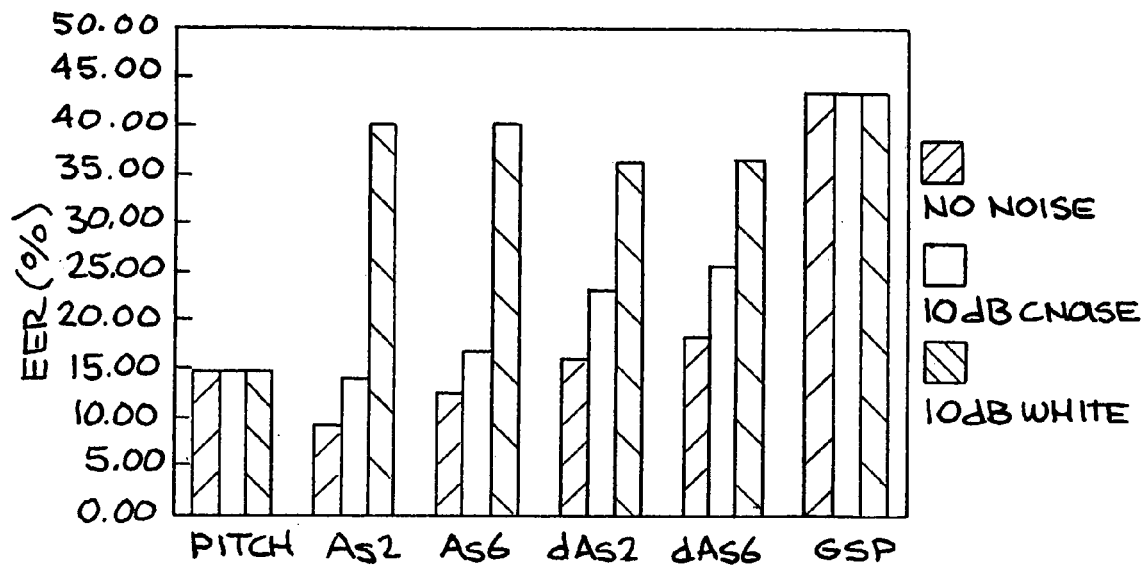
FIG. 15 shows the error rates for those parameters affected by the noise from Table 4.

Table 4 summarizes the individual error rates for the various parameters. Both GEMS pitch and the GSP error rates do not change with added acoustic noise. Both of these are purely GEMS based and thus have no dependence on acoustic information. However, the As are computed using the available acoustic information, and may be affected adversely by external noise. FIG. 14 and FIG. 15 show the error rates for those parameters affected by the noise from Table 4. Traditional pitch is more affected by cnoise while the spectral coefficients and their derivatives are more affected by white noise. The autocorrelation algorithm is especially susceptible to the cnoise due to the correlation between the noise and the speech from the speaker.

The ARMA model uses both audio and EM data to calculate ARMA coefficients. It is no surprise that the ARMA coefficients are less susceptible to noise of either type since they are only partially dependent on audio information. For white noise, the EER from traditional spectral coefficients (cepstral) had an average increase of 209%, while the GEMS based spectral parameters had a 193% increase. For the cnoise, the EER from cepstral parameters had an average increase of 94% while the EER from the GEMS based parameters had only a 43% increase.

TABLE 4

EER for each parameter, with and without added acoustic noise.

|  | EER (%) - No noise | EER (%) - 10 dB White noise | EER (%) - 10 dB Cnoise noise |
|---|---|---|---|
| Acoustic |  |  |  |
| Pitch | 15.14 | 15.67 | 27.86 |
| CC1 | 12.86 | 46.42 | 27.23 |
| CC6 | 13.74 | 48.90 | 23.15 |

TABLE 4-continued

EER for each parameter, with and without added acoustic noise.

|  | EER (%) - No noise | EER (%) - 10 dB White noise | EER (%) - 10 dB Cnoise noise |
|---|---|---|---|
| dCC1 | 14.52 | 44.74 | 34.67 |
| dCC6 | 22.79 | 48.23 | 35.56 |
| Gain | 27.74 | 27.51 | 31.35 |
| GEMS based |  |  |  |
| Pitch | 14.82 | 14.82 | 14.82 |
| As2 | 9.33 | 40.26 | 14.31 |
| As6 | 12.68 | 40.39 | 16.80 |
| dAs2 | 16.11 | 36.21 | 23.24 |
| dAs6 | 18.36 | 36.45 | 25.74 |
| GSP | 43.03 | 43.03 | 43.03 |

The results above demonstrate the ability of the individual verification parameters to distinguish and verify the identity of speakers. However, embodiments of the speaker verification method and system do not rely on one parameter alone to make the accept/reject decision. The Bayes classifier is used as described to combine the statistics of the individual parameters and calculate a combined, single EER. As described earlier, the classifier maps the normalized DTW distances from all the participating parameters into one vector. This mapping allows for a calculation of the overall EER, which is lower than the EER from any of the individual parameters. Parameters are chosen so that they compliment one another by being as statistically independent as possible.

Figure 16:
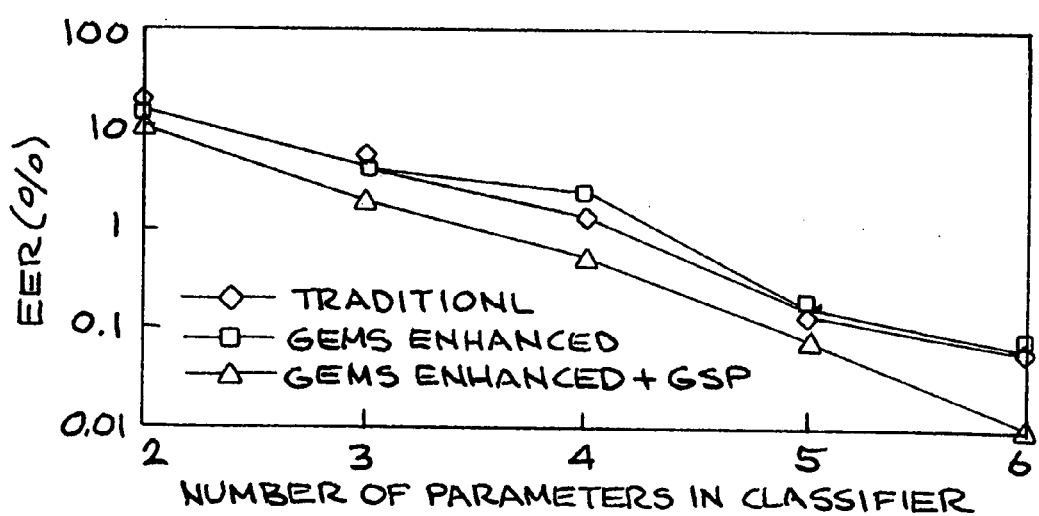
FIG. 16 shows the results for EER using the Bayes classifier.

FIG. 16 shows the results of the EER using the Bayes classifier. The EER points on the far left use two verification parameters and an additional parameter is added as the curve moves to the right. The three lines on each graph represent different possible verification systems. The first two have been discussed thus far: the traditional and the GEMS enhanced systems. Their performance is similar with the noiseless data. This is not completely surprising given that they both contain very similar information: gain, pitch, spectral coefficients and delta-spectral coefficients. Both sets of feature vectors are have similar information content and both sets of data were recorded in a controlled laboratory setting. The third line was constructed to show what the additional, purely GEMS based, GEMS shape parameter (GSP) can provide. An ultimate EER of 0.01% is obtained using the GEMS enhanced system with the GSP. This is a factor of seven lower than the traditional system. The motivation behind the third line is as follows. Every point in the first two curves adds an analogous parameter to the classifier. For example, the second point adds the $CC_1$ parameter in the traditional system and the analogous $As_2$ is added to the GEMS enhanced system. However, there is no acoustic based analog to the GSP. This additional pure GEMS based feature vector provides insight into how an optimized GEMS verification system would perform, even without the presence of noise.

Figure 17:
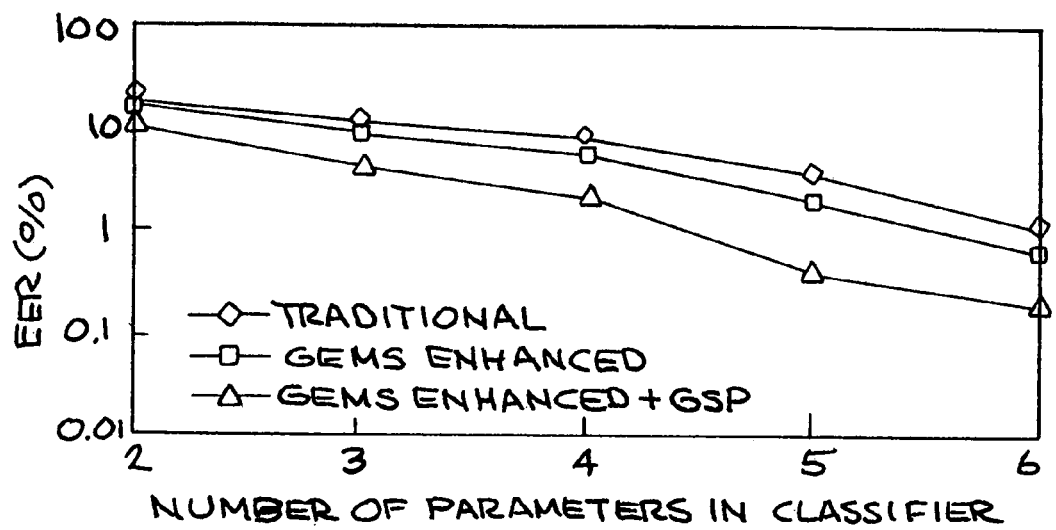
FIG. 17 summarizes system comparison results with −10 dB white noise.
Figure 18:
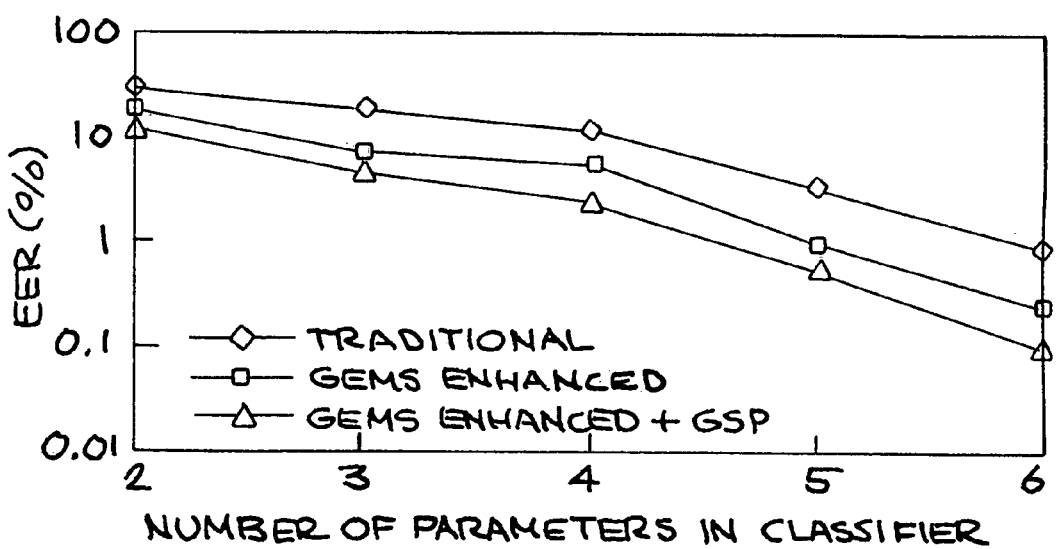
FIG. 18 summarizes system comparison results with −10 dB cnoise.

These results with two types of added noise were used in the Bayes classifier to get an overall comparison of the systems. FIG. 17 and FIG. 18 summarize the results with −10 dB white noise and −10 dB cnoise, respectively.

Table 5 decodes the abscissas for the Bayes classifier in FIG. 16, FIG. 17, and FIG. 18. The plus sign indicates that the parameter was added to the classifier in addition to the previous parameters. For example, for three parameters in the classifier, +$CC_1$, means Pitch, Gain and $CC_1$ were used in the classifier.

TABLE 5

Parameters used for each point in classifier figures

| Number of Parameters in classifier | Traditional Parameters | GEMS Enhanced Parameters |
|---|---|---|
| 2 | Pitch + Gain | Pitch + Gain |
| 3 | $+CC_1$ | $+As_2$ |
| 4 | $+dCC_1$ | $+dAs_2$ |
| 5 | $+CC_6$ | $+As_6$ |
| 6 | $+dCC_6$ | $+dAs_6$ |

As seen in the FIG. 17 and FIG. 18, the three lines are now well separated due to the addition of noise to the acoustic data, especially when the system includes more than two verification parameters. The results for the different systems differ by a factor of 1.7 with the added white noise and by over a factor of three with the cnoise. The bottom line, which is the GEMS system with the GSP parameter, illustrates again how well embodiments of the system perform, even in the presence of noise. The GSP augmented system shows almost a factor of six improvement over the traditional system with white noise and over a factor of nine improvement with the cnoise.

The invention claimed is:

1. A method for speaker verification, comprising:
    collecting a plurality of data from a speaker, wherein the plurality of data comprises acoustic data and non-acoustic data;
    using the plurality of data to generate a template comprising a first plurality of parameters;
    receiving a real-time identity claim from a claimant;
    using a plurality of acoustic data and non-acoustic data from the identity claim to generate a second plurality of parameters; and
    comparing the first plurality of parameters to the second plurality of parameters to determine whether the claimant is the speaker, wherein the first plurality of parameters and the second plurality of parameters include at least one purely non-acoustic parameter, including a non-acoustic glottal shape parameter parameter derived from averaging multiple glottal cycle waveforms.

2. The method of claim 1, wherein the first plurality of parameters and the second plurality of parameters each comprise:
    a pitch parameter extracted using non-acoustic data;
    at least one pitch synchronous spectral coefficient extracted using non-acoustic data;
    pitch synchronous auto-regressive and moving average (ARMA) coefficients extracted using non-acoustic data.

3. The method of claim 2, wherein extracting the ARMA coefficients comprises ARMA pole-zero modeling of a speech system, including computing the fast Fourier transform of the acoustic data and the non-acoustic data and solving for a transfer function, wherein the non-acoustic data comprises input of the modeled speech system, and the acoustic data comprises output of the modeled speech system.

4. The method of claim 2, wherein extracting the ARMA coefficients comprises ARMA pole-zero modeling of a speech system using a parametric linear model.

5. The method of claim 1, wherein the non-acoustic data comprises an electromagnetic (EM) signal that characterizes a motion of the speaker's tracheal and glottal tissues.

6. The method of claim 5, wherein the EM signal is sampled during the middle of phonation.

7. The method of claim 6, wherein a glottal shape parameter (GSP) is based on averaged multiple glottal cycle waveforms generated when the speaker utters a test sentence.

8. The method of claim 7, wherein non-consecutive two-glottal cycle waveforms are averaged to produce the GSP.

9. The method of claim 1, wherein generating the template comprises:
    extracting a parameter from each of multiple repetitions of each of a set of test sentences by the speaker;
    producing multiple feature vectors, each corresponding to a parameter;
    selecting one of the multiple feature vectors as a guide vector for dynamic time warping; and
    averaging the multiple feature vectors to produce a resultant feature vector that is part of the template.

10. The method of claim 9, wherein collecting the first plurality of data comprises the speaker uttering each of a set of test sentences, and wherein subsequent utterances of the test sentences by the speaker cause the template to be updated.

11. The method of claim 9, wherein comparing the first plurality of parameters to the second plurality of parameters to determine whether the claimant is the speaker comprises:
    using a dynamic warping algorithm to calculate a warping distance between a feature vector in the template and a corresponding feature vector generated from the second plurality of parameters; and
    determining whether the calculated distance is above or below a predetermined threshold.

12. The method of claim 11, wherein using a dynamic warping algorithm, comprises applying constraints comprising:
    a monotonicity constraint;
    at least one endpoint constraint;
    at least one global path constraint; and at least one local path constraint.

13. The method of claim 11, wherein the predetermined threshold is chosen such that a false acceptance error rate and a false rejection error rate are substantially equal.

14. The method of claim 13, wherein each feature vector generated from the second plurality of parameters has its own equal error rate (EER) based upon a corresponding warping distance from a feature vector that is part of the template.

15. The method of claim 13, wherein EERs of each feature vector generated from the second plurality of parameters are combined to generate an overall EER used to evaluate the speaker verification method.

16. A system for speaker verification, comprising:
    at least one microphone for collecting acoustic data from a speaker's voice;
    at least one sensor for collecting non-acoustic data from movements of the speaker's body;
    at least one processor;
    a memory device coupled to the processor, wherein the memory device stores instructions that when executed cause the processor to generate a template using the acoustic data and non-acoustic data, wherein the template comprises a first plurality of parameters, wherein when a claimant speaks an identity claim into the at least one microphone, the instruction further cause the processor to generate a second plurality of parameters, and to compare the first plurality of parameters to the second plurality of parameters to determine whether the claimant is the speaker, wherein the first plurality of parameters and the second plurality of parameters include at least one purely non-acoustic parameter, including a non-acoustic glottal shape parameter parameter derived from averaging multiple glottal cycle waveforms.

17. The system of claim 16, wherein the first plurality of parameters and the second plurality of parameters each comprise:
   a pitch parameter extracted using non-acoustic data;
   at least one pitch synchronous spectral coefficient extracted using non-acoustic data;
   pitch synchronous auto-regressive and moving average (ARMA) coefficients extracted using non-acoustic data.

18. The system of claim 17, wherein extracting the ARMA coefficients comprises ARMA pole-zero modeling of a speech system, including computing the fast Fourier transform of the acoustic data and the non-acoustic data and solving for a transfer function, wherein the non-acoustic data comprises input of the modeled speech system, and the acoustic data comprises output of the modeled speech system.

19. The system of claim 17, wherein extracting the ARMA coefficients comprises ARMA pole-zero modeling of a speech system using a parametric linear model.

20. The system of claim 16, wherein the non-acoustic data comprises an electromagnetic (EM) signal that characterizes a motion of the speaker's tracheal and glottal tissues.

21. The system of claim 20, wherein the EM signal is sampled during the middle of phonation.

22. The system of claim 21, wherein a glottal shape parameter (GSP) is based on averaged multiple glottal cycle waveforms generated when the speaker utters a test sentence.

23. The system of claim 22, wherein non-consecutive two-glottal cycle waveforms are averaged to produce the GSP.

24. The system of claim 16, wherein generating the template comprises:
   extracting a parameter from each of multiple repetitions of each of a set of test sentences by the speaker;
   producing multiple feature vectors, each corresponding to a parameter;
   selecting one of the multiple feature vectors as a guide vector for dynamic time warping; and
   averaging the multiple feature vectors to produce a resultant feature vector that is part of the template.

25. The system of claim 24, wherein collecting the first plurality of data comprises the speaker uttering each of a set of test sentences, and wherein subsequent utterances of the test sentences by the speaker cause the template to be updated.

26. The system of claim 24, wherein comparing the first plurality of parameters to the second plurality of parameters to determine whether the claimant is the speaker comprises:
   using a dynamic warping algorithm to calculate a warping distance between a feature vector in the template and a corresponding feature vector generated from the second plurality of parameters; and
   determining whether the calculated distance is above or below a predetermined threshold.

27. The system of claim 26, wherein using a dynamic warping algorithm, comprises applying constraints comprising:
   a monotonicity constraint;
   at least one endpoint constraint;
   at least one global path constraint; and
   at least one local path constraint.

28. The system of claim 26, wherein the predetermined threshold is chosen such that a false acceptance error rate and a false rejection error rate are substantially equal.

29. The system of claim 28, wherein each feature vector generated from the second plurality of parameters has its own equal error rate (EER) based upon a corresponding warping distance from a feature vector that is part of the template.

30. The system of claim 28, wherein EERs of each feature vector generated from the second plurality of parameters are combined to generate an overall EER used to evaluate the speaker verification system.

31. An electromagnetic medium, having stored thereon instructions that when executed, cause a processor to:
   collect a plurality of data from a speaker, wherein the plurality of data comprises acoustic data and non-acoustic data;
   use the plurality of data to generate a template comprising a first plurality of parameters;
   receive a real-time identity claim from a claimant;
   use a plurality of acoustic data and non-acoustic data from the identity claim to generate a second plurality of parameters; and
   compare the first plurality of parameters to the second plurality of parameters to determine whether the claimant is the speaker, wherein the first plurality of parameters and the second plurality of parameters include at least one purely non-acoustic parameter, including a non-acoustic glottal shape parameter derived from averaging multiple glottal cycle waveforms.

32. The electromagnetic medium of claim 31, wherein the first plurality of parameters and the second plurality of parameters each comprise:
   a pitch parameter extracted using non-acoustic data;
   at least one pitch synchronous spectral coefficient extracted using non-acoustic data;
   pitch synchronous auto-regressive and moving average (ARMA) coefficients extracted using non-acoustic data.

33. The electromagnetic medium of claim 32, wherein extracting the ARMA coefficients comprises ARMA pole-zero modeling of a speech system, including computing the fast Fourier transform of the acoustic data and the non-acoustic data and solving for a transfer function, wherein the non-acoustic data comprises input of the modeled speech system, and the acoustic data comprises output of the modeled speech system.

34. The electromagnetic medium of claim 32, wherein extracting the ARMA coefficients comprises ARMA pole-zero modeling of a speech system using a parametric linear model.

35. The electromagnetic medium of claim 31, wherein the non-acoustic data comprises an electromagnetic (EM) signal that characterizes a motion of the speaker's tracheal and glottal tissues.

36. The electromagnetic medium of claim 35, wherein the EM signal is sampled during the middle of phonation.

37. The electromagnetic medium of claim 36, wherein a glottal shape parameter (GSP) is based on averaged two-glottal cycle waveforms generated when the speaker utters a test sentence.

38. The electromagnetic medium of claim 37, wherein non-consecutive two-glottal cycle waveforms are averaged to produce the GSP.

39. The electromagnetic medium of claim 31, wherein generating the template comprises:
   extracting a parameter from each of multiple repetitions of each of a set of test sentences by the speaker;
   producing multiple feature vectors, each corresponding to a parameter;
   selecting one of the multiple feature vectors as a guide vector for dynamic time warping; and
   averaging the multiple feature vectors to produce a resultant feature vector that is part of the template.

40. The electromagnetic medium of claim 39, wherein collecting the first plurality of data comprises the speaker uttering each of a set of test sentences, and wherein subsequent utterances of the test sentences by the speaker cause the template to be updated.

41. The electromagnetic medium of claim 39, wherein comparing the first plurality of parameters to the second plurality of parameters to determine whether the claimant is the speaker comprises:
   using a dynamic warping algorithm to calculate a warping distance between a feature vector in the template and a corresponding feature vector generated from the second plurality of parameters; and
   determining whether the calculated distance is above or below a predetermined threshold.

42. The electromagnetic medium of claim 41, wherein using a dynamic warping algorithm, comprises applying constraints comprising:
   a monotonicity constraint;
   at least one endpoint constraint;
   at least one global path constraint; and
   at least one local path constraint.

43. The electromagnetic medium of claim 41, wherein the predetermined threshold is chosen such that a false acceptance error rate and a false rejection error rate are substantially equal.

44. The electromagnetic medium of claim 43, wherein each feature vector generated from the second plurality of parameters has its own equal error rate (EER) based upon a corresponding warping distance from a feature vector that is part of the template.

45. The method of claim 43, wherein EERs of each feature vector generated from the second plurality of parameters are combined to generate an overall EER used to evaluate the speaker verification method.

* * * * *